(12) United States Patent
Kodama et al.

(10) Patent No.: US 7,901,138 B2
(45) Date of Patent: Mar. 8, 2011

(54) FLUID BEARING DEVICE

(75) Inventors: Mitsuo Kodama, Kanagawa-ku (JP); Taketo Nonaka, Kanagawa-ku (JP)

(73) Assignee: Alphana Technology Co., Ltd., Fujieda-shi (JP)

( * ) Notice: Subject to any disclaimer, the term of this patent is extended or adjusted under 35 U.S.C. 154(b) by 376 days.

(21) Appl. No.: 11/525,020

(22) Filed: Sep. 22, 2006

(65) Prior Publication Data
US 2007/0071375 A1 Mar. 29, 2007

(30) Foreign Application Priority Data

Sep. 27, 2005 (JP) .................................. 2005-279486
Jul. 18, 2006 (JP) .................................. 2006-195321

(51) Int. Cl.
*F16C 32/06* (2006.01)
(52) U.S. Cl. ........................ 384/107; 384/119; 384/124
(58) Field of Classification Search .................. 384/107, 384/114, 119, 120, 124, 100
See application file for complete search history.

(56) References Cited

U.S. PATENT DOCUMENTS

| | | | | |
|---|---|---|---|---|
| 5,423,612 A | * | 6/1995 | Zang et al. | 384/119 |
| 5,728,240 A | * | 3/1998 | Yamamoto et al. | 148/563 |
| 5,941,644 A | * | 8/1999 | Takahashi | 384/112 |
| 7,008,112 B2 | * | 3/2006 | Yamashita et al. | 384/119 |
| 7,048,444 B2 | * | 5/2006 | Kurimura et al. | 384/119 |
| 2008/0291574 A1 | * | 11/2008 | Obara | 360/224 |

FOREIGN PATENT DOCUMENTS

| | | |
|---|---|---|
| JP | 8-210364 | 8/1996 |
| JP | 2002-101610 | 4/2002 |
| JP | 2002101610 A * | 4/2002 |
| JP | 2003056556 A * | 2/2003 |

OTHER PUBLICATIONS http://metals.about.com/gi/dynamic/offsite.htm?site=http://www.handyharmancanada.com/TheBrazingBook/comparis.htm.*

* cited by examiner

*Primary Examiner* — Thomas R Hannon
*Assistant Examiner* — Phillip A Johnson
(74) *Attorney, Agent, or Firm* — Connolly Bove Lodge & Hutz LLP

(57) ABSTRACT

A fluid bearing device (50B, 50AB) is composed of a shaft (1, 51); a sleeve (9, 59) into which the shaft (1, 51) is inserted; and lubrication fluid (20) intervening in a gap between the shaft (1, 51) and the sleeve (9, 59), the fluid bearing device (50B, 50AB) supporting the shaft (1, 51) so as to be relatively rotatable freely with respect to the sleeve (9, 59), wherein an end portion of the sleeve (9, 59) is provided with a taper ring (4, 54) in annular shape, wherein at least either one of an inner circumferential surface (4a, 54a) of the taper ring (4, 54) and an outer circumferential surface (1a, 91b) of the shaft (1, 51) facing towards the inner circumferential surface (4a, 54a) of the taper ring (4, 54) is formed into a tapered surface (4a, 54a), which inclines in a direction as a gap between the inner circumferential surface (4a, 54a) of the taper ring (4, 54) and the outer circumferential surface (1a, 91b) of the shaft (1, 51) widens in accordance with leaving from the sleeve (9, 59) and forms a taper seal section (50TS, 50ATS) that prevents the lubrication fluid (20) from leaking out, and wherein the taper ring (4, 54) is formed by a material having coefficient of thermal expansion larger than that of the sleeve (9, 59) and the shaft (1, 51).

2 Claims, 6 Drawing Sheets

FLUID BEARING DEVICE

BACKGROUND OF THE INVENTION

1. Field of the Invention

The present invention relates to a fluid bearing device, particularly, relates to a fluid bearing device, which is suitably mounted to a disc driving motor to be installed in a hard disc drive.

2. Description of the Related Art

The Japanese publication of unexamined patent applications Nos. 2002-101610 and 8-210364/1996 disclose a motor mounted with a conventional fluid bearing device respectively. Such a motor mounted with a conventional fluid bearing device is exemplified in FIG. 6.

FIG. 6 is a cross sectional view of a motor mounted with a conventional fluid bearing device according to the prior art.

In FIG. 6, a motor 500 is a disc driving motor utilized for a hard disc drive, and the motor 500 is composed of a stator 500S and a rotor 500R.

The stator 500S is constituted by a motor base J13, a sleeve J9, which is made from brass and fixed on an inner circumferential surface of a raised section J13a in an annular shape that is formed on a center portion of the motor base J13, and a stator core J14, which is fixed on an outer circumferential surface of the raised section J13a.

The rotor 500R is constituted by a hub J2 and a ring magnet J6, which is fixed to the hub J2.

A hard disc not shown is mounted on an outer circumferential surface J2a of the hub J2.

Further, a shaft J1 made from stainless steel is fixed into a center hole J2b of the hub J2.

In the above-mentioned configuration, the sleeve J9 supports the shaft J1 in a thrust direction and a radial direction through a fluid bearing. Consequently, by the fluid bearing, the rotor 500R is supported rotatable freely with respect to the stator 500S.

A fluid bearing in the radial direction is constituted by an outer circumferential surface J1a of the shaft J1, an inner circumferential surface J9a of the sleeve J9 and lubrication fluid 20 that is filled in a gap between the outer circumferential surface J1a and the inner circumferential surface J9a. The lubrication fluid 20 also constitutes a not shown fluid bearing in the thrust direction.

A taper seal section JTS, which seals in the lubrication fluid 20, is provided on an end portion of the sleeve J9 on the side confronting with the hub J2. The taper seal section JTS is formed by the inner circumferential surface J9a of the sleeve J9 and the outer circumferential surface J1a of the shaft J1, which confronts with the inner circumferential surface J9a.

Further, a filling amount of the lubrication fluid 20 is regulated such that a fluid level 20Ja of the lubrication fluid 20 remains within the taper seal section JTS.

In the motor 500 mounted with the above-mentioned conventional fluid bearing, the lubrication fluid 20 is filled inside the bearing. By using pressure of the lubrication fluid 20 generated by revolution of the rotor 500R, the shaft J1 is supported rotatable freely without contacting with other members such as the sleeve J9.

Further, the taper seal section JTS for sealing in the lubrication fluid 20 is provided on an open-end section of the fluid bearing. The taper seal section JTS is formed in a shape, which prevents the lubrication fluid 20 from leaking out even though the lubrication fluid 20 is expanded by temperature rise caused by revolution of the rotor 500R.

In other words, the taper seal section JTS is formed in a shape that enables to reserve a prescribed capacity of the lubrication fluid 20.

By using some examples, the expansion of the lubrication fluid 20 is described next.

A coefficient of linear expansion of the shaft J1, which is made from stainless steel, is $10.5 \times 10^{-6}/°C$. On the contrary, a coefficient of linear expansion of the sleeve J9, which is made from brass, is $17 \times 10^{-6}/°C$.

Further, a usable upper limit temperature of the motor 500 is generally 80° C. Consequently, an increment of temperature is 55° C. when an ambient temperature rises from the room temperature of 25° C. to the upper limit temperature of 80° C.

The fluid bearing is constituted at the room temperature of 25° C. such that the shaft J1 made from stainless steel of which an outer diameter is 4.0000 mm and a length is 20.000 mm, is inserted into a center hole of the sleeve J9 made from brass, wherein an inner diameter of the center hole is 4.0050 mm and a depth or a length of the center hole is 21.000 mm.

Further a capacity or a cubic volume for reserving the lubrication fluid 20 of the gap between the sleeve J9 and the shaft J1 except the taper seal section JTS is 13.227 mm³.

When a temperature rises from the room temperature to 80° C., the inner diameter of the center hole of the sleeve J9 changes into 4.0087 mm, the outer diameter of the shaft J1 changes into 4.0023 mm, and the cubic volume of the gap changes into 13.227 mm³. In other words, the cubic volume increases 1.0154 times and a rate of the increase is 1.54%.

On the other hand, the taper seal section JTS is formed such that a minimal diameter is 4.0050 mm, a maximal diameter is 4.2050 mm, and a length in the axial direction is 2.1000 mm at the room temperature of 25° C. respectively. A cubic volume of the taper seal section JTS is 1.4091 mm³ at the room temperature of 25° C.

Accordingly, when a temperature rises from the room temperature to 80° C., the cubic volume of the taper seal section JTS changes into 1.4306 mm³. In other words, the cubic volume of the taper seal section JTS increases 1.0153 times and a rate of the increase is 1.53% at the temperature of 80° C.

On the contrary, a coefficient of linear expansion of oil, which is commonly used as the lubrication fluid 20, is $8 \times 10^{-6}/°C$. When temperature rises from the room temperature of 25° C. to 80° C., an increment of temperature increase is 55° C. Consequently, a rate of increase of cubic volume of the oil is 4.40%.

As mentioned above, with respect to increase of a capacity or a cubic volume caused by temperature rise, an amount of increase of a cubic volume of lubrication fluid itself is larger than a total amount of capacity increase of the cubic volume of the gap between the sleeve J9 and the shaft J1 except the taper seal section JTS for reserving the lubrication fluid 20 and the capacity increase of the taper seal section JTS.

Accordingly, the fluid level 20Ja of the lubrication fluid 20 rises in the taper seal section JTS in response to temperature rise.

More specifically, in the case a distance between an end surface J9b of the sleeve J9 and the fluid level 20Ja in FIG. 6 is assumed to be 1.100 mm at the room temperature of 25° C., subtracting total amount of increased capacity for reserving the lubrication fluid 20 from volume expansion of the lubrication fluid 20 itself becomes 0.3824 mm³ when temperature rises up to 80° C. In this case, the fluid level 20Ja rises by 0.479 mm. Consequently, a length of the taper seal section JTS in the axial direction is designated such that the lubrication fluid 20 does not overflow even when the fluid level 20Ja rises as mentioned above.

In the case of actually designing a motor mounted with a fluid bearing, a shape of a taper seal section must be designed in consideration of dimensional variations possibly occur while mass producing, a decreased amount of lubrication fluid due to evaporation, and a waving fluid level of the lubrication fluid caused by shock applied externally, in addition to the rise of the fluid level.

However, a total thickness of a motor is strictly restricted. For example, in the case of installing the motor in a hard disc drive, the total thickness of the motor is regulated to be 7.5 mm or less. If a length of a taper seal section in the axial direction is made longer, a bearing span in the thrust direction is made shorter in response to the extended length of the taper seal section, and resulting in increasing burden on the bearing.

Accordingly, there existed a problem such that rotational vibration of a rotor increased.

With respect to the above-mentioned problem, it has been studied that a material of sleeve has been changed into another material having a coefficient of linear expansion, which was larger than that of other members.

According to the above-mentioned configuration such that a coefficient of linear expansion of the sleeve is larger than that of other members, an inner diameter of a sleeve expands in response to a rising temperature, and resulting in increasing a capacity of a taper seal section. Consequently, rise of a fluid level of lubrication fluid is suppressed. However, a section for reserving the lubrication fluid other than the taper seal section, that is, a gap between the shaft and the sleeve is extremely small, so that the gap drastically expands and stiffness of the bearing is deteriorated, and resulting in a further problem such that rotational vibration of the rotor extremely increases.

SUMMARY OF THE INVENTION

Accordingly, in consideration of the above-mentioned problems of the prior arts, an object of the present invention is to provide a fluid bearing device, which is less in rotational vibration and high in reliability, without extending a length of a bearing in the axial direction.

In order to achieve the above object, the present invention provides, according to an aspect thereof, a fluid bearing device comprising: a shaft; a sleeve into which the shaft is inserted; and lubrication fluid intervening in a gap between the shaft and the sleeve, the fluid bearing device supporting the shaft so as to be relatively rotatable freely with respect to the sleeve, wherein an end portion of the sleeve is provided with a taper ring in annular shape, wherein at least either one of an inner circumferential surface of the taper ring and an outer circumferential surface of the shaft facing towards the inner circumferential surface of the taper ring is formed into a tapered surface, which inclines in a direction as a gap between the inner circumferential surface of the taper ring and the outer circumferential surface of the shaft widens in accordance with leaving from the sleeve and forms a taper seal section that prevents the lubrication fluid from leaking out, and wherein the taper ring is formed by a material having coefficient of thermal expansion larger than that of the sleeve and the shaft.

Other object and further features of the present invention will be apparent from the following detailed description when read in conjunction with the accompanying drawings.

DETAILED DESCRIPTION OF THE PREFERRED EMBODIMENTS

First Embodiment

A motor mounted with a fluid bearing device according to a first embodiment of the present invention is a disc driving motor to be installed in a hard disc drive.

Figure 1:
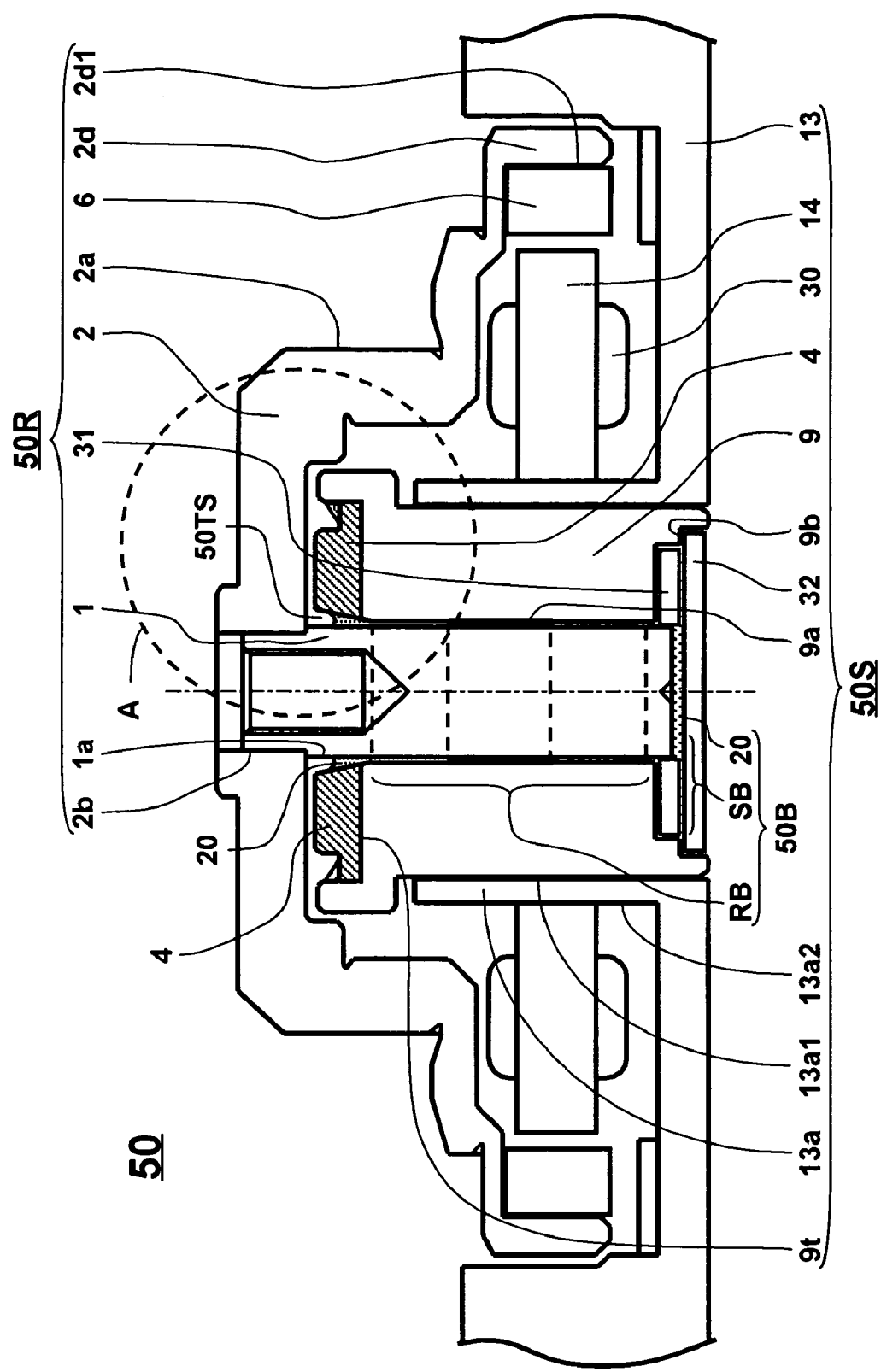
FIG. 1 is a cross sectional view of a motor mounted with a fluid bearing device according to a first embodiment of the present invention.

FIG. 1 is a cross sectional view of a motor mounted with a fluid bearing device according to a first embodiment of the present invention.

Figure 2:
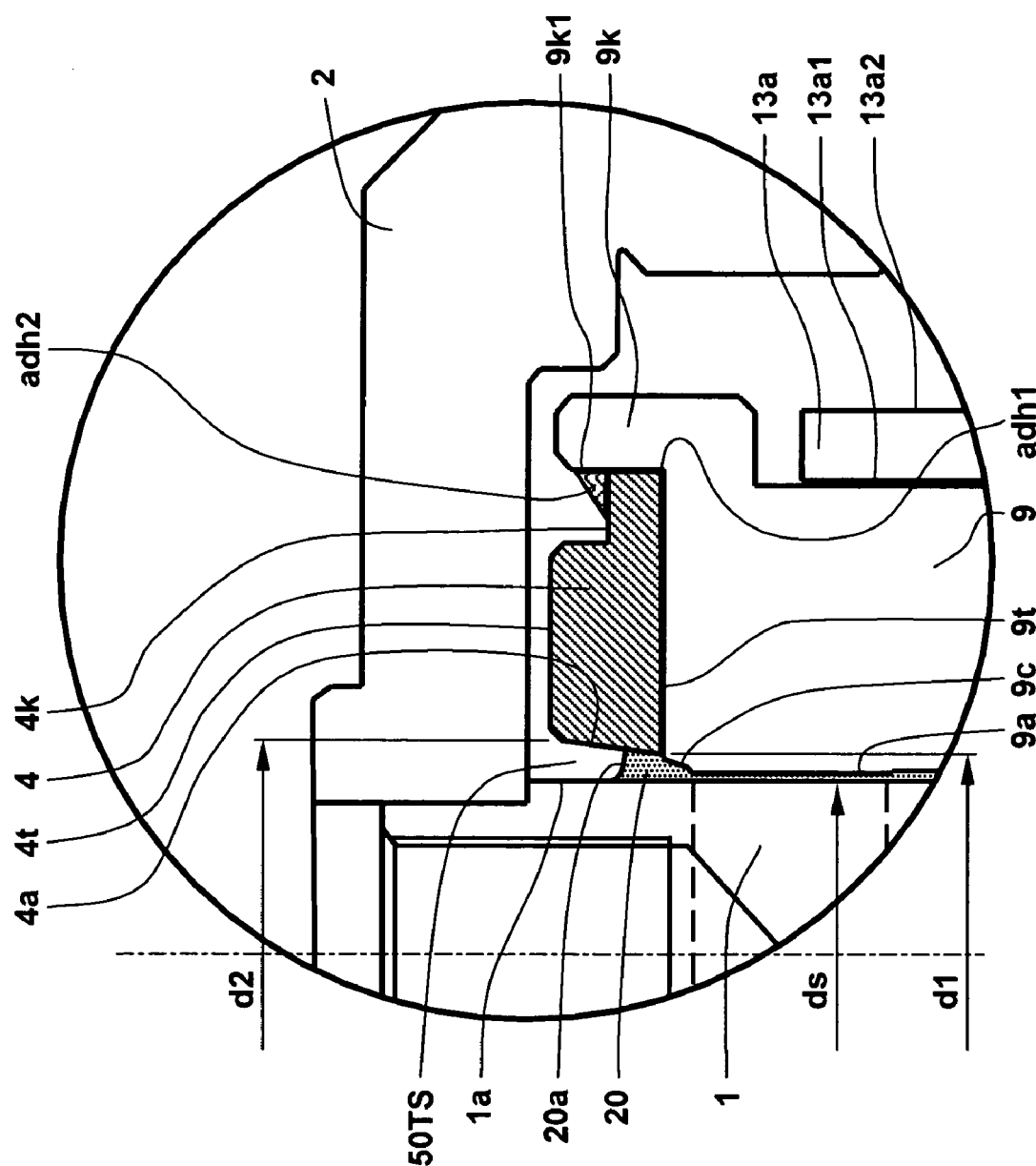
FIG. 2 is a fragmentary cross sectional view, with enlarging a part of the motor indicated by a circle "A" in FIG. 1.

FIG. 2 is a fragmentary cross sectional view, with enlarging a part of the motor indicated by a circle "A" in FIG. 1.

Figure 3:
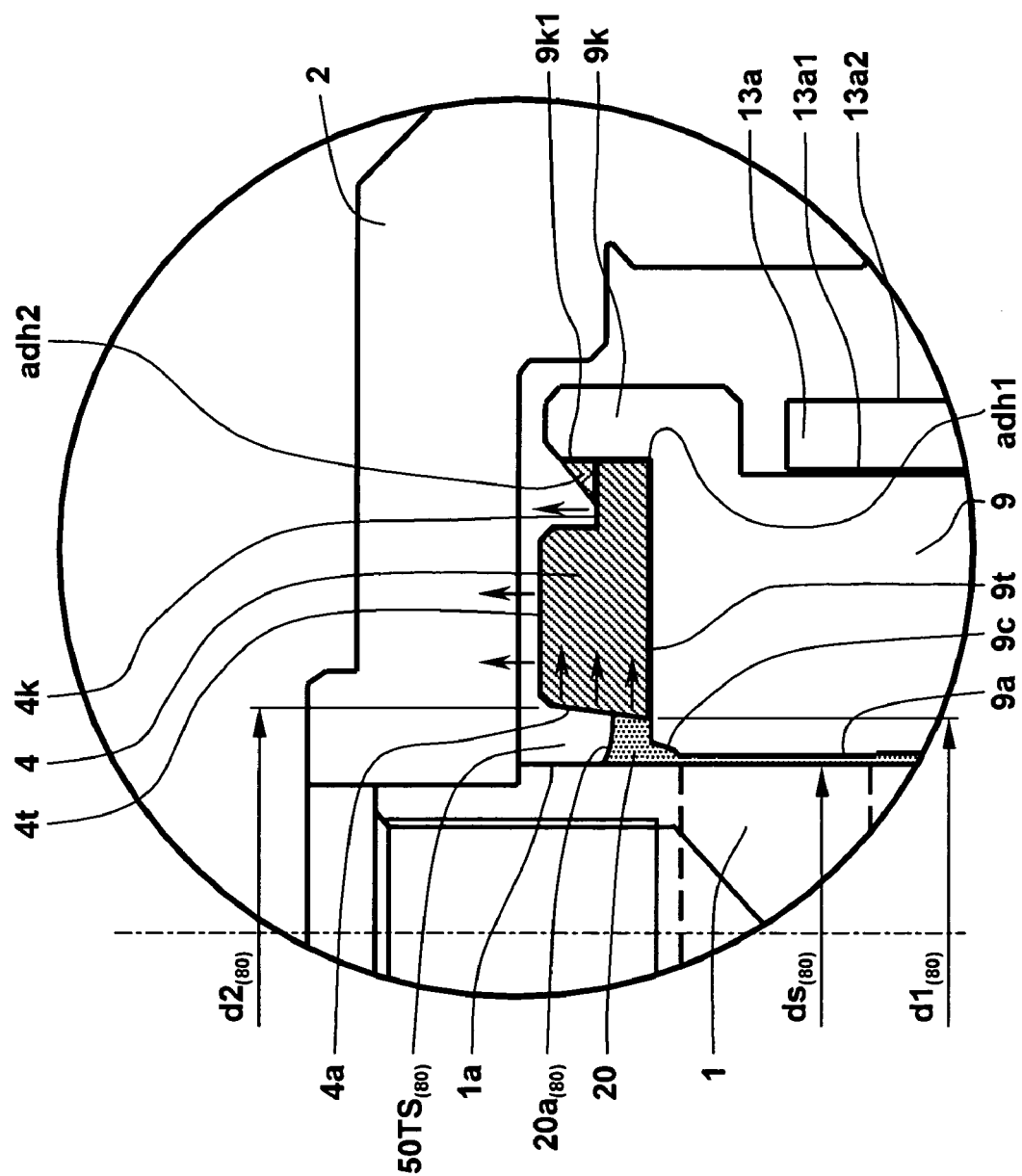
FIG. 3 is another enlarged fragmentary cross sectional view of the part "A" of the motor shown in FIG. 1 under ambience of a higher temperature.

FIG. 3 is another enlarged fragmentary cross sectional view of the part "A" of the motor shown in FIG. 2 under ambience of a higher temperature.

In FIG. 1, a motor 50 mounted with a fluid bearing device according to the first embodiment of the present invention is composed of a stator 50S and a rotor 50R.

The stator 50S is further composed of a motor base 13, a sleeve 9 that is made of brass and fixed on an inner circumferential surface 13a1 of a raised section 13a, which is formed in an annular shape at a center potion of the motor base 13, a stator core 14 in a cylindrical shape that is fixed on an outer circumferential surface 13a2 of the raised section 13a, and a taper ring 4 that is fixed on an end surface 9t of the sleeve 9. The stator core 14 is provided with a plurality of protruded poles not shown. A coil 30 is wound around each protruded pole of the stator core 14.

On the other hand, the rotor 50R is further composed of a hub 2 in approximately a cup shape and a magnet 6 in a ring shape that is fixed on inner wall surface 2d1 of a peripheral wall 2d, which is provided at an outermost circumference of the hub 2.

A hard disc not shown is mounted on an outer circumferential surface 2a of the hub 2.

A shaft 1 made of stainless steel is fixed in a center hole 2b of the hub 2.

The shaft 1 is inserted into the sleeve 9 and supported through a fluid bearing device 50B in a radial direction and a thrust direction.

The fluid bearing device 50B is constituted by a bearing RB in the radial direction (hereinafter referred to as "radial fluid bearing" RB) and another bearing SB in the thrust direction (hereinafter referred to as "thrust fluid bearing" SB).

The radial fluid bearing RB is constituted by an outer circumferential surface 1a of the shaft 1, an inner circumferential surface 9a of the sleeve 9 and lubrication fluid 20 that is filled in a gap between the outer circumferential surface 1a of the shaft 1 and the inner circumferential surface 9a of the sleeve 9.

On the other hand, the thrust fluid bearing SB is constituted by a stepped section 9b that is formed in a lower end portion of the sleeve 9, a thrust ring 31 that is fixed at an end portion of the shaft 1 and contained in the stepped section 9b, a thrust plate 32 that is fixed to the stepped section 9b for sealing an open-end portion of the sleeve 9, and lubrication fluid 20, which is filled in gaps among these members, that is, a gap between the sleeve 9 and the thrust ring 31, another gap between a bottom surface of the thrust ring 31 and a top surface of the thrust plate 32.

By the above-mentioned configuration of the fluid bearing device 50B, the rotor 50R is supported rotatable freely with respect to the stator 50S.

In reference to FIG. 2, a taper seal section 50TS, which functions as a major part of the fluid bearing device 50B, is detailed next.

In the fluid bearing device 50B according to the first embodiment of the present invention, the taper seal section 50TS is constituted by the shaft 1, the sleeve 9, a protruded wall 9k, which is protruded in an annular shape from an outer circumferential section of the sleeve 9 in the axial direction, and the taper ring 4 that is fixed on the end surface 9t of the sleeve 9. The taper ring 4 is fixed on the end surface 9t by an adhesive agent "adh1" and also fixed to the protruded wall 9k by another adhesive agent "adh2".

An anaerobic adhesive that is suitable for surface bonding, for example, can be used for the adhesive agent "adh1".

The other adhesive agent "adh2" is piled up at a corner and hardens, so that an epoxy adhesive that is less in volume change, for example, can be used for the other adhesive agent "adh2".

Further, an area to be coated with the other adhesive agent "adh2" in an outer circumferential side of the taper ring 4 is formed with a recessed section 4k for thinning a thickness of the taper ring 4 in the axial direction. By the recessed section 4k, the other adhesive agent "adh2" never protrudes from a top surface 4t of the taper ring 4.

Accordingly, a total thickness of the motor 50 in the axial direction never increases by the other adhesive agent "adh2".

Furthermore, by fixing an outer circumferential surface of the taper ring 4 on an inner wall surface 9k1 of the protruded wall 9k, centering the taper ring 4 can be performed accurately.

In the above-mentioned fixing method of the taper ring 4, when the taper ring 4 is expanded by temperature rise caused by revolution of the rotor 50R, the taper ring 4 is deformed such that a thickness of the taper ring 4 increases as well as increasing an inner diameter of the taper ring 4. However, an outer circumferential surface of the taper ring 4 is made contact with the inner wall surface 9k1 of the protruded wall 9k.

Accordingly, the taper ring 4 never peels off from a bonded surface between the taper ring 4 and the end surface 9t of the sleeve 9.

With reference to FIG. 2, a configuration of the taper seal section 50TS including the taper ring 4 is described more specifically. FIG. 2 exhibits a state of the taper seal section 50TS at the room temperature of 25° C.

In FIG. 2, the taper seal section 50TS is constituted by the outer circumferential surface 1a of the shaft 1, a first tapered surface 9c that is formed on the inner circumferential surface 9a of the sleeve 9 in the end surface 9t side with being slanted, wherein an inner diameter of the first tapered surface 9c gradually increases in accordance with approaching the end surface 9t, and a second tapered surface 4a, which is an inner circumferential surface of the taper ring 4 and formed in a shape of which inner diameter increases in accordance with leaving from the end surface 9t of the sleeve 9.

In other words, a gap between the inner circumferential surface of the taper ring 4, that is, the second tapered surface 4a and the outer circumferential surface 1a of the shaft 1 in a radial direction is formed such that the gap expands in accordance with leaving from the end surface 9t of the sleeve 9.

The lubrication fluid 20 is filled as much as a fluid level 20a remains in the middle of the taper seal section 50TS.

Description is given to thermal expansion of each member constituting the motor 50 mounted with the fluid bearing device 50B according to the first embodiment of the present invention in detail next.

The shaft 1 is made of martensitic stainless steel, the sleeve 9 is made of copper alloy and the taper ring 4 is made of aluminum. Each coefficient of thermal expansion of the shaft 1, the sleeve 9 and the taper ring 4 is as follows:

the shaft 1 is $10.5 \times 10^{-6}/°$ C.,
the sleeve 9 is $17 \times 10^{-6}/°$ C. and
the taper ring 4 is $23.5 \times 10^{-6}/°$ C.

In other words, the taper ring 4 is made from a material having a coefficient of thermal expansion, which is larger than that of the shaft 1 or the sleeve 9.

Further, ester oil is utilized for the lubrication fluid 20 and its coefficient of thermal expansion is $8 \times 10^{-6}/°$ C.

Each member is formed so as to be following dimensions at the room temperature of 25° C.

An outer diameter "ds" of the shaft 1 is 4.0000 mm,
a minimal inner diameter "d1" of the taper ring 4 on the second tapered surface 4a, that is, an inner diameter of the taper ring 4 in the end surface 9t side is 4.0050 mm, and
a maximal inner diameter "d2" of the taper ring 4 on the second tapered surface 4a, that is, an inner diameter of the taper ring 4 in the top surface 4t side is 4.2050 mm.

With assuming that a temperature of each member rises up to 80° C. when ambient temperature is raised by revolution of the rotor 50R, a temperature increment from 25° C. to 80° C. is 55° C. As the result of the temperature increment of 55° C., each dimension changes to a tendency to increase as mentioned below. Hereupon, in order to distinguish each dimension at 80° C. from 25° C., reference signs are added with a suffix "$_{(80)}$". In reference to FIG. 3, a state at 80° C. of a taper seal section 50TS$_{(80)}$ is depicted.

Each dimension at 80° C. is as follows:
an outer diameter "ds$_{(80)}$" of the shaft 1 is 4.0023 mm,
a minimal inner diameter "d1$_{(80)}$" of the taper ring 4 on the second tapered surface 4a is 4.0102 mm, and
a maximal inner diameter "d2$_{(80)}$" of the taper ring 4 on the second tapered surface 4a is 4.2104 mm.

Further, as mentioned above, the taper ring 4 is fixed on the end surface 9t of the sleeve 9 by the adhesive agent "adh1" and also fixed to the protruded wall 9k by the other adhesive agent "adh2". Consequently, when the taper ring 4 expands by the temperature rise caused by the revolution of the rotor 50R, dimensions of the taper ring 4 change such that the thickness of the taper ring 4 increases as well as increasing its inner diameter as shown by arrows in FIG. 3.

By the dimensional change, a capacity of the taper seal section 50TS$_{(80)}$ changes from 1.4091 mm$^3$ to 1.4505 mm$^3$, that is, expands 1.0294 times. Consequently, a rate of the expansion increment is 2.94%.

The expansion of 2.94% is approximately twice the capacity increment of 1.23% according to the motor mounted with the conventional fluid bearing device.

On the other hand, a capacity or a gap of the fluid bearing device 50B retaining the lubrication fluid 20 also increases or expands. In this case, since the fluid bearing device 50B is constituted by a combination of the shaft 1 made of stainless steel and the sleeve 9 made of copper alloy, a capacity increment of the fluid bearing device 50B is 1.54% the same increment as the motor mounted with the conventional fluid bearing device according to the prior art.

Further, a cubic volume of the lubrication fluid 20 increases by 4.40%.

Integrating increments of capacities or cubic volumes caused by expansion of each member and the lubrication fluid makes a fluid level $20a_{(80)}$ of the lubrication fluid 20 displace or raise by 0.466 mm when the temperature rises from the room temperature of 25° C. to 80° C. The displacement amount of 0.466 mm is smaller by 0.013 mm with respect to the displacement amount of 0.479 mm according to the motor mounted with the conventional fluid bearing device of the prior art.

Accordingly, a length of the taper seal section $50TS_{(80)}$ in the axial direction can be shortened by 0.013 mm with respect to the conventional configuration of the motor 500 excluding the taper ring 4. In other words, the total thickness of the motor 50 mounted with the fluid bearing device 50B according to the present invention can be thinned by 0.013 mm.

As it is apparent from the description mentioned above, the larger the coefficient of thermal expansion of a material for the taper ring 4, the more preferable it is.

In the case POM (polyacetal resin), for example, is used for the taper ring 4 as a material, its coefficient of thermal expansion is $90 \times 10^{-6}$/° C., so that the coefficient of thermal expansion is much larger than that of aluminum. In this case, displacement of a fluid level or a fluid level rise at 80° C. is 0.326 mm with defining that other members and dimensions are the same conditions.

Accordingly, a displacement amount of the taper ring 4 made of POM is smaller than that of the taper ring 4 made of aluminum by 0.140 mm.

In other words, it is possible for the total thickness of the motor 50 mounted with the fluid bearing device 50B to be thinned by 0.140 mm furthermore.

According to the configuration of the taper seal section 50TS detailed above, it is possible to increase a retaining capacity of the lubrication fluid 20 in the taper seal section 50TS without extending excessively a filling gap for the lubrication fluid 20 in the fluid bearing device 50B excluding the taper seal section 50TS. Consequently, by controlling rise of a fluid level of the lubrication fluid 20 when the temperature rises, a length of the fluid bearing device 50B in the axial direction can be shortened.

Further, it is not necessary for a bearing span to be shortened. Consequently, decline in stiffness of a bearing caused by shortening a bearing span never happens or rotational vibration of the rotor 50R is hardly increased.

Furthermore, the gap between the shaft 1 and the sleeve 9 is never enlarged excessively.

Accordingly, decline in stiffness of a bearing is suppressed and rotational vibration of the rotor 50R is hardly increased.

Second Embodiment

With referring to FIG. 4 and FIG. 5, a fluid bearing device according to a second embodiment of the present invention is detailed next.

Figure 4:
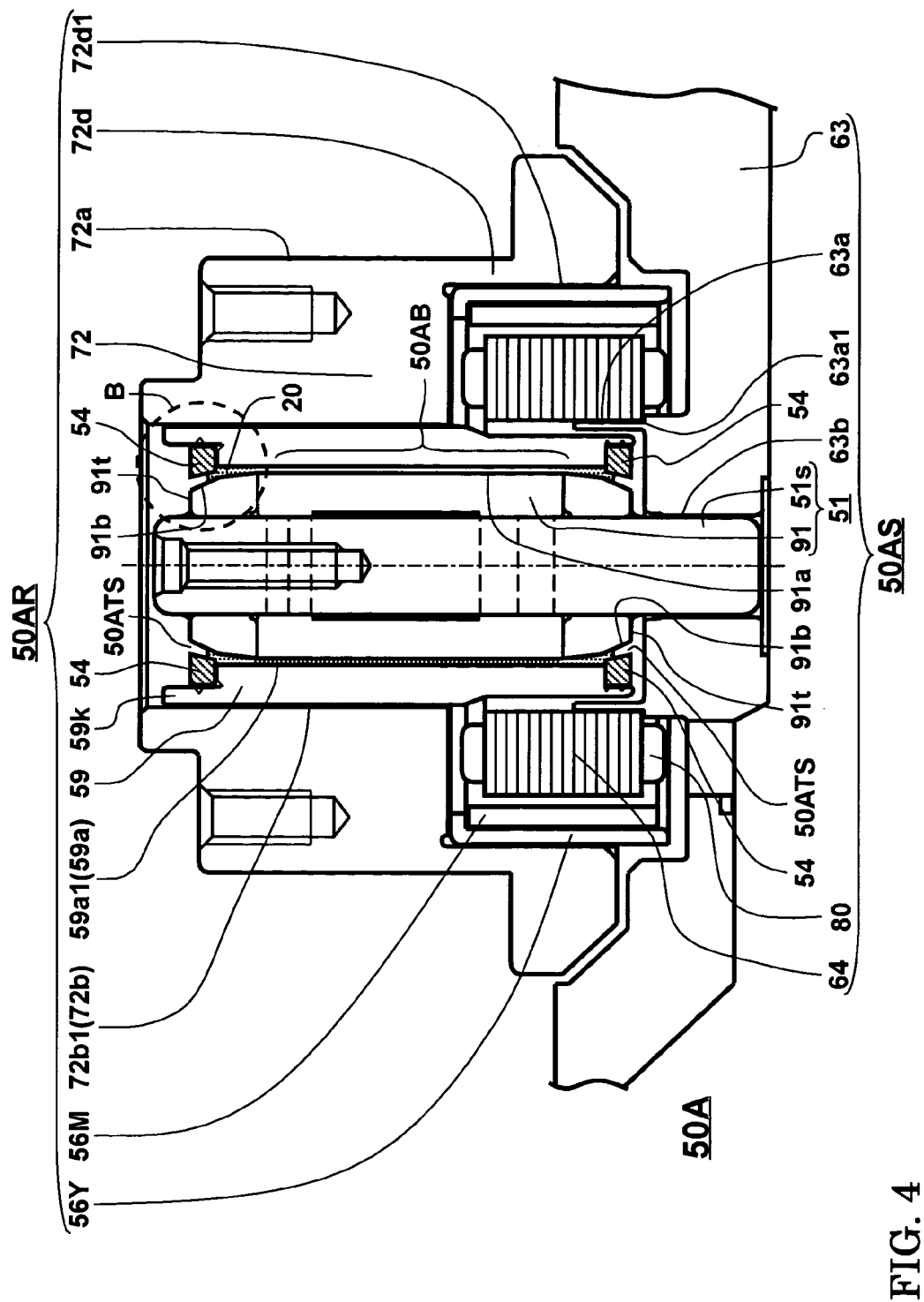
FIG. 4 is a cross sectional view of a motor mounted with a fluid bearing device according to a second embodiment of the present invention.

FIG. 4 is a cross sectional view of a motor mounted with a fluid bearing device according to a second embodiment of the present invention.

Figure 5:
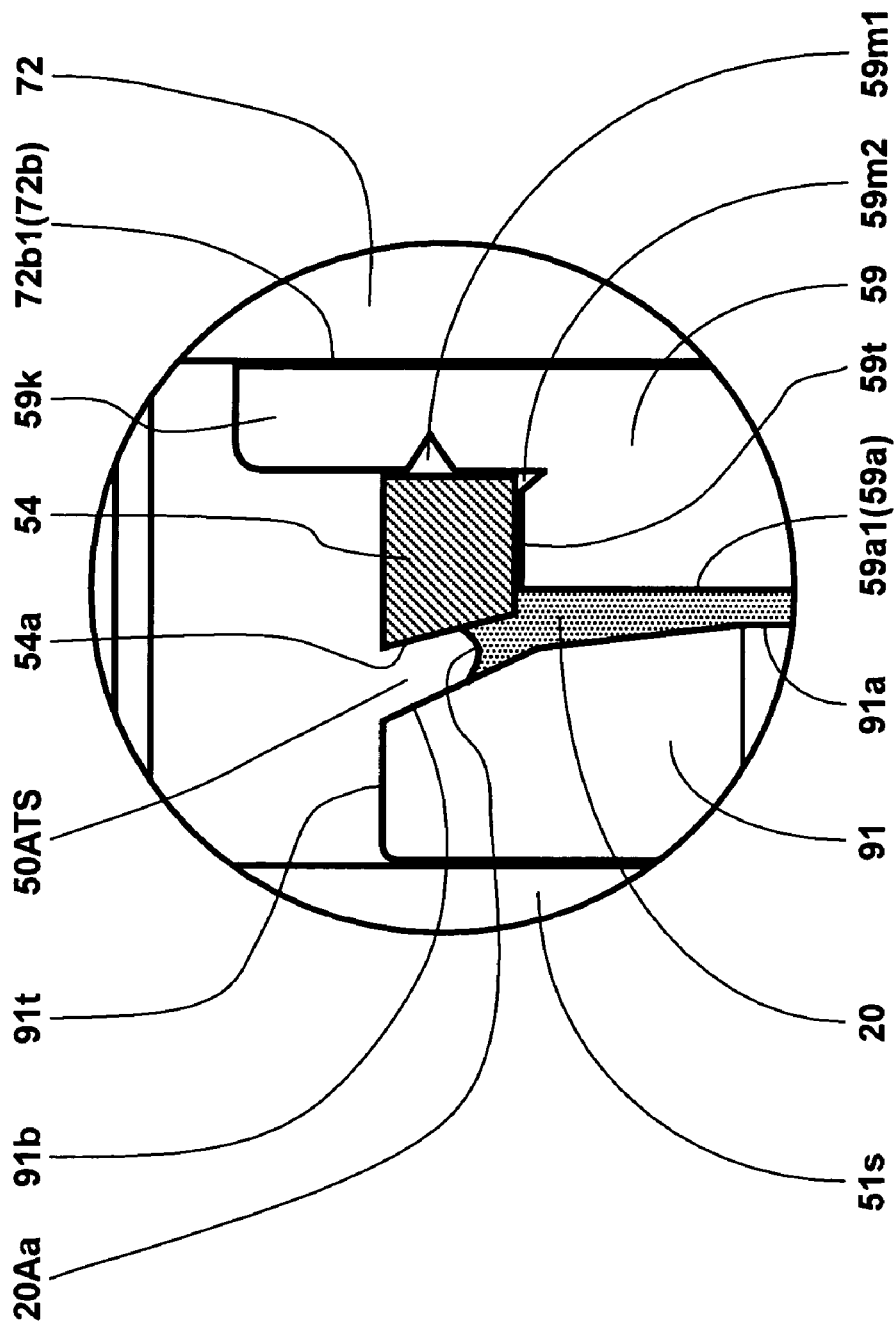
FIG. 5 is a fragmentary cross sectional view, with enlarging a part of the motor indicated by a circle "B" in FIG. 4.
Figure 6:
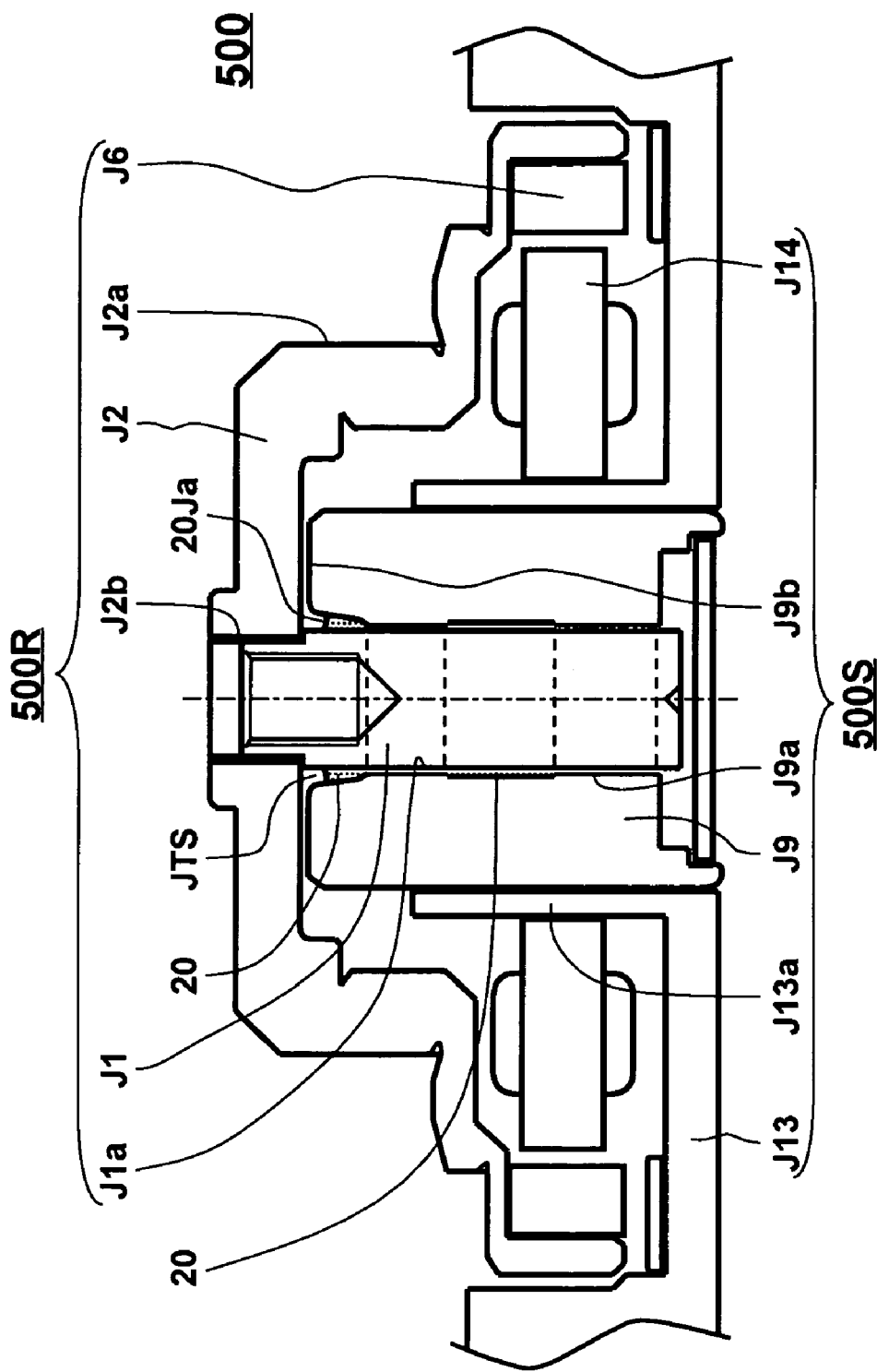
FIG. 6 is a cross sectional view of a motor mounted with a conventional fluid bearing device according to the prior art.

FIG. 5 is a fragmentary cross sectional view, with enlarging a part of the motor indicated by a circle "B" in FIG. 4.

In FIG. 4, a motor 50A mounted with a fluid bearing device according to the second embodiment of the present invention is a disc driving motor to be installed in a hard disc drive. The motor 50A is composed of a stator 50AS and a rotor 50AR.

In the case of the motor 50 according to the first embodiment, the sleeve 9 fixed to the motor base 13 supports the shaft 1 rotatable freely. On the contrary, in the case of the motor 50A according to the second embodiment, one end portion of a shaft core 51s is fixed to a motor base 63 and the rotor 50AR including a sleeve 59 rotates with respect to the shaft core 51s.

The stator 50AS is constituted by the motor base 63 and a stator core 64 in an annular shape, which is fixed on an outer circumferential surface 63a1 of a raised section 63a in an annular shape that is formed on the motor base 63.

The stator core 64 is provided with a plurality of protruded poles not shown, and a coil 80 is wound around each protruded pole of the stator core 64.

The shaft core 51s made of stainless steel is fixed in a center hole 63b of the motor base 63, and a cylindrical body 91 in a cylinder shape is fixed on an outer circumferential surface of the shaft core 51s. In other words, the shaft core 51s is integrated into the cylindrical body 91. Consequently, the integrated shaft core 51s and the cylindrical body 91 can be assumed as a shaft 51 totally.

The rotor 50AR is constituted by a hub 72 in approximately a cup shape having a through hole 72b, a yoke 56Y in a ring shape that is fixed on an inner wall surface 72d1 of a peripheral wall 72d provided in an outer circumference of the hub 72, and a magnet 56M in a ring shape that is fixed on an inner circumferential surface of the yoke 56Y.

A hard disc not shown is mounted on an outer circumferential surface 72a of the hub 72.

Further, a sleeve 59 is fixed on an inner surface 72b1 of the through hole 72b of the hub 72.

Furthermore, a taper ring 54 is fixed to both end portions of the sleeve 59 respectively.

The cylindrical body 91 is inserted into a through hole 59a of the sleeve 59, and then the cylindrical body 91 is supported by the sleeve 59 through a fluid bearing device 50AB in radial and thrust directions.

Accordingly, by the above-mentioned configuration of the motor 50A, the rotor 50AR is supported rotatable freely with respect to the stator 50AS.

The fluid bearing device 50AB is constituted by an inner circumferential surface 59a1 of the through hole 59a of the sleeve 59, an outer circumferential surface 91a of the cylindrical body 91 and lubrication fluid 20 that is filled in a gap between the inner circumferential surface 59a1 of the sleeve 59 and the outer circumferential surface 91a of the cylindrical body 91.

A taper seal section 50ATS, which functions as a major part of the fluid bearing device 50AB, is provided in both end portions of the sleeve 59 respectively.

Hereinafter, a taper seal section 50ATS provided in a top end portion of the sleeve 59 is described as a representative of the two taper seal sections provided in top and bottom end portions of the sleeve 59. Details of the taper seal section 50ATS provided in the top end portion of the sleeve 59 and its neighbouring area are illustrated in FIG. 5.

More specifically, as shown in FIG. 5, the taper seal section 50ATS is constituted by the inner circumferential surface 59a1 of the sleeve 59, a first tapered surface 91b that is provided on the outer circumferential surface 91a of the cylindrical body 91 in an end surface 91t side, wherein an outer diameter of the first tapered surface 91b decreases gradually in accordance with approaching the end surface 91t, and a second tapered surface 54a, which is an inner circumferential surface of the taper ring 54 that is fixed on an end surface 59t of the sleeve 59, wherein an inner diameter of the second tapered surface 54a decreases gradually in accordance with leaving from the end surface 59t.

The taper ring 54 is fixed to the sleeve 59 in such a manner that an outer circumferential surface of the taper ring 54 is adhered on an inner circumferential surface of an annular wall 59k, which protrudes in the axial direction on the sleeve 59. Consequently, positioning a center of the taper ring 54 can be performed accurately.

In FIG. 5, circular grooves 59m1 and 59m2 having a triangular cross section, which are provided on the inner circumferential surface of the annular wall 59k and at an inner corner formed by the annular wall 59k and the end surface 59t, are reservoirs for storing adhesive agent that preferably maintains necessary amount of adhesive agent for adhering the taper ring 54 to the sleeve 59.

The first tapered surface 91b confronts with the second tapered surface 54a with having a gap between them. Each gradient of the first and second tapered surfaces 91b and 54a is set to be such that a distance in a radial direction between them increases in accordance with leaving from the end surface 59t of the sleeve 59.

The lubrication fluid 20 is filled in the taper seal section 50ATS with such an amount as to remain a fluid level 20Aa of the lubrication fluid 20 in the middle of the taper seal section 50ATS.

Under the above-mentioned configuration of the motor 50A, the cylindrical body 91 is made from the same material as the shaft core 51s. The other members are made from the same materials as those in the first embodiment.

Further, the taper ring 54 is made from a material of which a coefficient of thermal expansion is larger than that of the cylindrical body 91 and the sleeve 59.

By the above-mentioned arrangement of materials, the second tapered surface 54a of the taper ring 54 expands vastly in the radial direction in response to temperature rise caused by revolution of the rotor 50AR, and resulting in increasing the capacity of the taper seal section 50ATS so as to accord with volume expansion of the lubrication fluid 20. Consequently, the fluid level 20Aa of the lubrication fluid 20 rises slightly in response to temperature rise caused by revolution of the rotor 50AR.

Accordingly, even in the second embodiment, a length of the taper seal section 50ATS in the axial direction can be shortened as the same manner as the first embodiment, and resulting in enabling to shorten a total thickness of the motor 50A mounted with the fluid bearing device 50AB as much as the shortened length of the taper seal section 50ATS.

In other words, the fluid bearing device 50AB can extremely increase a retaining capacity of the lubrication fluid 20 in the taper seal section 50ATS without excessively enlarging gaps to be filled with the lubrication fluid 20 other than the taper seal section 50ATS.

Accordingly, the fluid bearing device 50AB can control rise of the fluid level 20Aa caused by temperature rise, and resulting in enabling to shorten the length of the taper seal section 50ATS itself.

Further, it is not necessary for a bearing span to be shortened. Consequently, decline in stiffness of a bearing caused by shortening a bearing span never happens, or there is no chance to increase rotational vibration of the rotor 50AR.

Furthermore, the gap between the shaft 51 and the sleeve 59 is never enlarged excessively, so that decline in stiffness of a bearing is suppressed, and there is no chance to increase rotational vibration of the rotor 50AR.

In addition thereto, it shall be understood that a material of either one of the two taper rings 54, not both of them, can be replaced by another material having a larger coefficient of thermal expansion than other members.

According to each of the first and second embodiments detailed above, the fluid bearing device 50B or 50AB achieves particular effects even in a lower temperature ambience.

In a lower temperature ambience, the lubrication fluid 20 shrinks thermally, and resulting in reducing its cubic volume.

On the other hand, a coefficient of thermal expansion of the taper ring 4 or 54 is larger than that of the other members such as shaft 1 or 51 and the sleeve 9 or 59. Consequently, in a lower temperature ambience, the taper ring 4 or 54 shrinks extremely more than the other members, and resulting in increasing a rate of reducing the capacity of the taper seal section 50TS or 50ATS.

Accordingly, lowering the fluid level 20a or 20Aa of the lubrication fluid 20 caused by volume shrinkage of the lubrication fluid 20 is controlled, and resulting in enabling to prevent so-called "running out of lubrication fluid" in a section such as a dynamic pressure generating section, wherein the "running out of lubrication fluid" denotes that the fluid level 20a or 20Aa never reaches to the taper seal section 50TS or 50ATS, that is, the fluid level 20a or 20Aa never positions in the middle of the taper seal section 50TS or 50ATS.

As mentioned above, each of the fluid bearing devices 50B and 50AB is hardly affected by change of temperature and can maintain initial performances over a prolonged period, and exhibits extremely higher reliability.

As it is apparent from each embodiment detailed above, designating a coefficient of thermal expansion and dimensions of each member can arbitrary control a positional change of fluid level of lubrication fluid caused by temperature change in the taper seal section 50TS or 50ATS.

Each of the first and second embodiments exemplifies how to control a fluid level that rises in response to temperature rise. However, it is possible to control a fluid level so as to change very little by temperature rise.

Further, it is also possible to control a fluid level so as to lower adversely in response to temperature rise.

In any case, a fluid level can be kept remaining in the taper seal section 50TS or 50ATS even though temperature changes, and an increment of fluid level change can be controlled in a minimal amount.

Accordingly, a length of a fluid bearing device itself in the axial direction can be shortened, and resulting in thinning a total thickness of a motor mounted with the fluid bearing device in the axial direction.

According to the present invention, there is provided a motor mounted with a fluid bearing device, which exhibits excellent effects such as less in rotational vibration and high in reliability without extending a length of the fluid bearing device in the axial direction.

While the invention has been described above with reference to a specific embodiment thereof, it is apparent that many changes, modification and variations in materials and the arrangement of equipment and devices can be made without departing from the invention concept disclosed herein.

For example, each of the first and second embodiments of the present invention exemplifies a fluid bearing device, which is mounted in a motor for driving a disc to be installed in a hard disc drive. However, the fluid bearing device is not limited to be mounted in a disc driving motor, but can be mounted in any motors as far as the motors uses a fluid bearing.

Further, each of the first and second embodiments of the present invention exemplifies oil as lubrication fluid. However, as a matter of fact, lubrication fluid is not limited to oil.

Further, with respect to fluidity of the lubrication fluid, fluidity is also not limited to a specific one. A semi-fluidity material is also acceptable for lubrication fluid. In this case, a fluid level described in the first and second embodiments can be understood such that a fluid level includes an interface between a surface of the semi-fluidity material and air in the taper seal section.

In the first embodiment of the present invention, it describes the example such that a tapered surface constituting the taper seal section 50TS is provided only in the taper ring 4 side. However, the tapered surface is not limited to be provided therein. A tapered surface can also be provided in the shaft 1 side confronting with the taper ring 4 as well as in the taper ring 4 side.

Further, it is also acceptable that a tapered surface can be provided only in the shaft 1 side instead of providing in the taper ring 4 side.

In any case, it is only required for a gap between the inner circumferential surface 4*a* of the taper ring 4 and the outer circumferential surface 1*a* of the shaft 1 in the radial direction to be formed in such a manner as the gap widens in accordance with approaching the hub 2.

It should be understood that many modifications and adaptations of the invention will become apparent to those skilled in the art and it is intended to encompass such obvious modifications and changes in the scope of the claims appended hereto.

What is claimed is:

1. A fluid bearing device comprising:

a shaft;

a sleeve into which the shaft is inserted;

lubrication fluid intervening in a gap between the shaft and the sleeve, the fluid bearing device supporting the shaft so as to be relatively rotatable freely with respect to the sleeve, wherein the sleeve is provided with a protruded wall that is protruded in an annular shape from an outer circumferential section of the sleeve in the axial direction, wherein an end portion of the sleeve is provided with a taper ring in annular shape, wherein the taper ring is affixed on a surface of the end portion of the sleeve allocated in the axial direction of the sleeve by an adhesive agent, wherein at least either one of an inner circumferential surface of the taper ring and an outer circumferential surface of the shaft facing towards the inner circumferential surface of the taper ring is formed into a tapered surface, which inclines in an axial direction of the shaft as a gap between the inner circumferential surface of the taper ring and the outer circumferential surface of the shaft widens in accordance with leaving from the end portion of the sleeve upward in the axial direction, wherein the inner circumferential surface of the taper ring and the outer circumferential surface of the shaft forms a taper seal section that prevents the lubrication fluid from leaking out, wherein the taper ring is formed by a material having a coefficient of thermal expansion larger than that of the sleeve and the shaft, wherein the taper ring is deformed by temperature rise such that a thickness of the taper ring increases and an inner diameter of the taper ring increases so that a bottom surface of the taper ring confronting the sleeve is fixed on an end surface of the sleeve, and an outer circumferential surface of the taper ring is fixed on an inner wall surface of the protruded wall of the sleeve, and a top surface and the inner circumferential surface of the taper ring being opposite sides of the sleeve are relieved, wherein a recessed section is formed on the taper ring in an outer circumferential side so as to thin a thickness of the taper ring in the axial direction, wherein the recessed section is coated with another adhesive agent, wherein the another adhesive agent coated on the recessed section never protrudes from the top surface of the taper ring, and further wherein the another adhesive agent coated on the recessed section of the taper ring is different from the adhesive agent affixing the taper ring on the surface of the end portion of the sleeve.

2. The fluid bearing device as claimed in claim 1, wherein the another adhesive agent is an epoxy adhesive.

* * * * *